US011955041B1

(12) United States Patent
Lin

(10) Patent No.: US 11,955,041 B1
(45) Date of Patent: Apr. 9, 2024

(54) CONTROL CIRCUIT FOR CONTROLLING DISPLAY PANEL

(71) Applicant: HIMAX TECHNOLOGIES LIMITED, Tainan (TW)

(72) Inventor: Chih-Feng Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/323,426

(22) Filed: May 25, 2023

(51) Int. Cl.
*G09G 3/00* (2006.01)
*G09G 3/20* (2006.01)

(52) U.S. Cl.
CPC ........... *G09G 3/006* (2013.01); *G09G 3/2096* (2013.01); *G09G 2310/08* (2013.01); *G09G 2330/12* (2013.01)

(58) Field of Classification Search
CPC .. G09G 3/006; G09G 3/2096; G09G 2310/08; G09G 2330/12; G01R 31/2896
USPC ...................................................... 324/760.01
See application file for complete search history.

(56) References Cited

U.S. PATENT DOCUMENTS

| | | | | |
|---|---|---|---|---|
| 2007/0182440 | A1* | 8/2007 | Cha | G09G 3/006 324/760.01 |
| 2020/0402433 | A1* | 12/2020 | Kim | G01R 31/2896 |
| 2021/0027680 | A1* | 1/2021 | Im | G09G 3/006 |

* cited by examiner

*Primary Examiner* — Abdul-Samad A Adediran
(74) *Attorney, Agent, or Firm* — JCIPRNET

(57) ABSTRACT

The control circuit for controlling a display panel is provided. The control circuit includes a first driving circuit and a second driving circuit for driving the display panel. The first driving circuit includes first output terminals and first input terminals. The first driving circuit outputs a plurality of test signals to the first output terminals sequentially during different periods in a diagnosis stage. The second driving circuit includes second input terminals and second output terminals. The second driving circuit receives the test signals through the second input terminals in the diagnosis stage, and outputs a plurality of response signals to the second output terminals sequentially during different periods in response to the test signals. The first driving circuit receives the response signals through the first input terminals, and judges a connecting status of the first driving circuit and the second driving circuit according to the response signals.

10 Claims, 11 Drawing Sheets

CONTROL CIRCUIT FOR CONTROLLING DISPLAY PANEL

BACKGROUND

Technical Field

The disclosure generally relates to a control circuit, and more particularly to a control circuit for controlling a display panel.

DESCRIPTION OF RELATED ART

Currently, a display becomes more and more complex. The display needs two or more driving circuits to drive a display panel of the display. If a number of driving circuits is larger, a circuit connection between the driving circuits becomes more complicated. Generally, if the circuit connection is abnormal. Operators or maintainers manually check the abnormal connection point of the driving circuits one by one. The above manually check manner consumes at least a lot of time cost.

Thus, how to provide an automatic checking mechanism for checking the circuit connection between the driving circuits is one of the research and development focuses of those skilled in the art.

SUMMARY

The disclosure provides a control circuit for controlling a display panel. The control circuit provides an automatic diagnosis mechanism for checking a circuit connection of driving circuits in the control circuit.

The control circuit includes a first driving circuit and a second driving circuit. The first driving circuit is connected to a first part of the display panel. The first driving circuit drives the first part in an operating stage. The first driving circuit includes first output terminals and first input terminals. The first driving circuit outputs a plurality of test signals to the first output terminals sequentially during different periods in a diagnosis stage. The second driving circuit is connected to a second part of the display panel. The second driving circuit drives the second part in the operating stage. The second driving circuit includes second input terminals and second output terminals. The second input terminals are connected to the first output terminals in one-by-one manner. The second output terminals are connected to the first input terminals in one-by-one manner. The second driving circuit receives the test signals through the second input terminals in the diagnosis stage, and outputs a plurality of response signals to the second output terminals sequentially during different periods in the diagnosis stage in response to the test signals. The first driving circuit receives the response signals through the first input terminals in the diagnosis stage, and judges a connecting status of the first driving circuit and the second driving circuit according to the response signals.

Based on the above, in the diagnosis stage, the second driving circuit outputs the response signals to the second output terminals sequentially during different periods in response to the test signals. The first driving circuit receives the response signals through the first input terminals in the diagnosis stage, and judges the connecting status of the first driving circuit and the second driving circuit. Therefore, the control circuit provides an automatic diagnosis mechanism for checking a circuit connection of the first driving circuit and the second driving circuit.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms “include”, “comprise” and “have” are used in an open-ended fashion, and thus should be interpreted to mean “include, but not limited to . . . ”. Thus, when the terms “include”, “comprise” and/or “have” are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being "coupled to", "connected to", or "conducted to" another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Figure 1:
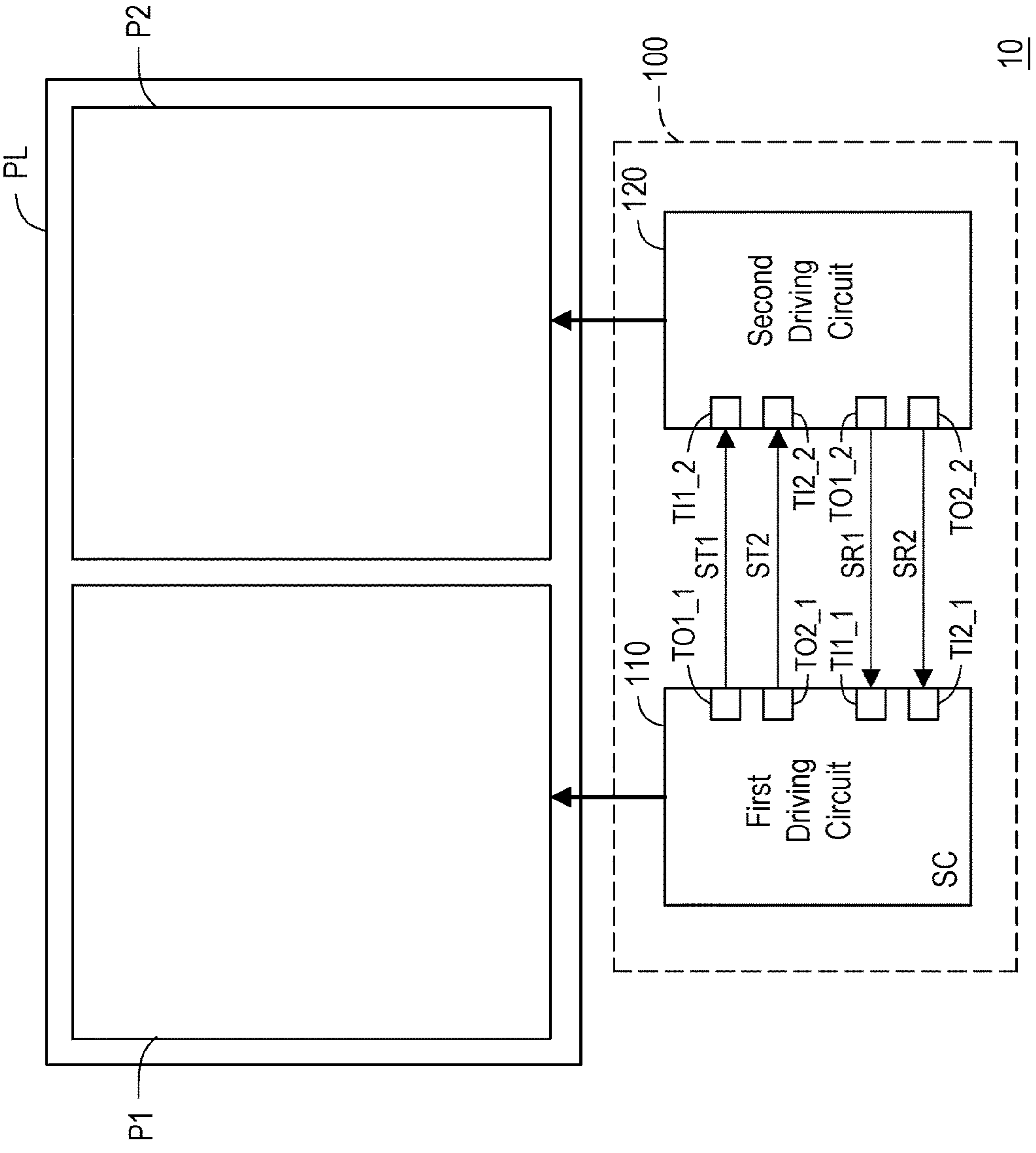
FIG. 1 illustrates a schematic diagram of a display according to an embodiment of the disclosure.

FIG. 1 illustrates a schematic diagram of a display according to an embodiment of the disclosure. FIG. 1 illustrates the display 10 including a display panel PL and a control circuit 100. In the embodiment, the control circuit 100 is used to control the display panel PL. The control circuit 100 is a driving device for driving the display panel PL. The control circuit 100 includes a first driving circuit 110 and a second driving circuit 120. The first driving circuit 110 is connected to a first part P1 of the display panel PL. The first driving circuit 110 drives the first part P1 of the display panel PL in an operating stage. The second driving circuit 120 is connected to a second part P2 of the display panel PL. The second driving circuit drives the second part P2 of the display panel PL in the operating stage.

In the embodiment, the first driving circuit 110 includes first output terminals TO1_1 and TO2_1, and first input terminals TI1_1 and TI2_1. The first driving circuit 110 outputs test signals ST1 and ST2 to the first output terminals TO1_1 and TO2_1 sequentially during different periods in a diagnosis stage. For example, during a first period, the first driving circuit 110 outputs the test signal ST1 to the first output terminal TO1_1. During a second period, the first driving circuit 110 outputs the test signal ST2 to the first output terminal TO2_1.

In the embodiment, the second driving circuit 120 includes second input terminals TI1_2 and TI2_2 and second output terminals TO1_2 and TO2_2. The second input terminals TI1_2 and TI2_2 are connected to the first output terminals TO1_1 and TO2_1 in one-by-one manner. The second output terminals TO1_2 and TO2_2 are connected to the first input terminals TI1_1 and TI2_1 in one-by-one manner. For example, the second input terminals TI1_2 is connected to the first output terminals TO1_1. The second input terminals TI2_2 is connected to the first output terminals TO2_1. The second output terminals TO1_2 is connected to the first input terminals TI1_1. The second output terminals TO2_2 is connected to the first input terminals TI2_1.

In the embodiment, the second driving circuit 120 receives the test signals ST1 and ST2 through the second input terminals TI1_2 and TI2_2 in the diagnosis stage. In the diagnosis stage, the second driving circuit 120 outputs response signals SR1 and SR2 to the second output terminals TO1_2 and TO2_2 sequentially during different periods in response to the test signals ST1 and ST2. For example, after receiving the test signals ST1 and ST2, the second driving circuit 120 outputs the response signal SR1 to the second output terminal TO1_2 during a third period and then outputs the response signal SR2 to the second output terminal TO2_2 during a fourth period. In the embodiment, the second driving circuit 120 may judge the test signals ST1 and ST2. When at least one of the test signals ST1 and ST2 is abnormal, the second driving circuit 120 generates the response signals SR1 and SR2 including an abnormal information.

In the embodiment, in the diagnosis stage, the first driving circuit 110 receives the response signals SR1 and SR2 through the first input terminals TI1_1 and TI2_1. The first driving circuit 110 judges a connecting status of the first driving circuit 110 and the second driving circuit 120 according to the response signals SR1 and SR2.

For example, when the response signals SR1 and SR2 includes the abnormal information, the first driving circuit 110 judges that a connecting status of the first input terminals TI1_1 and TI2_1 and the second output terminals TO1_2 and TO2_2 is abnormal. For example, when a timing of the response signal SR1 is similar to a timing of the response signal SR2, the first driving circuit 110 judges that a connecting status of the first input terminals TI1_1 and TI2_1 and the second output terminals TO1_2 and TO2_2 is abnormal. For example, the first output terminals TO1_1 and TO2_1 may be shorted from each other. For example, the first input terminals TI1_1 and TI2_1 may be shorted from each other. Therefore, the first driving circuit 110 at least judges the connecting status of the first input terminals TI1_1 and TI2_1 and the second output terminals TO1_2 and TO2_2.

It should be noted, in the diagnosis stage, the second driving circuit 120 outputs the response signals SR1 and SR2 sequentially during different periods in response to the test signals ST1 and ST2. The first driving circuit 110 judges the connecting status of the first driving circuit 110 and the second driving circuit 120. Therefore, the control circuit 100 provides an automatic diagnosis mechanism for checking a circuit connection of the first driving circuit 110 and the second driving circuit 120. The control circuit 100 further increases a speed for checking a circuit connection of the first driving circuit 110 and the second driving circuit 120.

The diagnosis stage may be a test stage before shipping the display 10 or before shipping the control circuit 100. The diagnosis stage may be a test stage when booting the display 10.

In the embodiment, the first output terminals TO1_1 and TO2_1, the first input terminals TI1_1 and TI2_1, the second input terminals TI1_2 and TI2_2 and the second output terminals TO1_2 and TO2_2 are used to transmit signals in the operating stage. For example, each of the signals may be one of a horizontal sync signal, a vertical sync signal, gate driving signal, reset signal and data signal.

In the embodiment, each of the first driving circuit 110 and the second driving circuit 120 may be a driving integrated circuit (IC).

Besides, the first driving circuit 110 provides a complete signal SC to the second driving circuit through at least one of the first output terminals TO1_1 and TO2_1 when finishing judging the connecting status. The second driving circuit 120 finishes the diagnosis stage in response to the complete signal SC. Therefore, the control circuit 100 leaves the connecting status.

In the embodiment, the first driving circuit 110 is called a master driving circuit. The second driving circuit 120 is called a slave driving circuit.

In some embodiments, the control circuit 100 includes the first driving circuit 110 and at least two second driving circuit for driving different part of the display panel PL. The disclosure is not limited by a number of second driving circuits of the embodiment.

Figure 2:
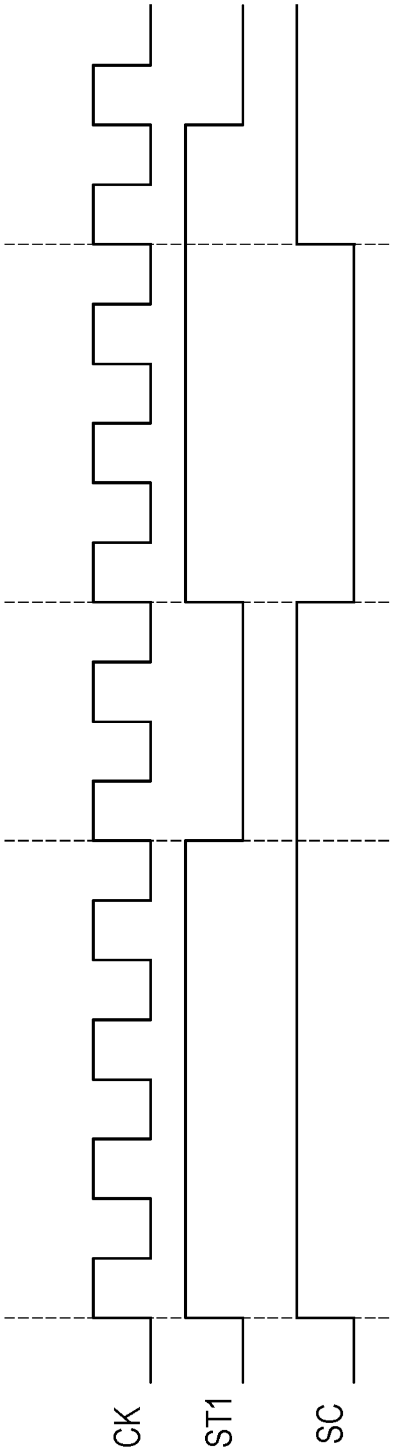
FIG. 2 illustrates timing diagrams of a test signal and a complete signal according to an embodiment of the disclosure.

FIG. 2 illustrates timing diagrams of a test signal and a complete signal according to an embodiment of the disclosure. FIG. 2 illustrates timing diagrams of the test signal ST1 and the complete signal SC. Please refer to FIG. 1 and FIG. 2, in the embodiment, the first driving circuit 110 sets a waveform of the test signal ST1 according to a first cycle number of a system clock CK and a second cycle number of a system clock CK. The first driving circuit 110 sets a time length of a high level of the test signals ST1 according to a first cycle number of a system clock CK. For example, the first driving circuit 110 sets the first cycle number as "4", the disclosure is not limited thereto. Therefore, the time length of the high level of the test signals ST1 is equal to 4 cycles of the system clock CK. The high level may be a high voltage level, a high current level or a high logic level.

The first driving circuit 110 sets a time length of a low level of the test signals ST1 according to a second cycle number of a system clock CK. For example, the first driving circuit 110 sets the second cycle number as "2", the disclosure is not limited thereto. Therefore, the time length of the low level of the test signals ST1 is equal to 2 cycles of the system clock CK. The low level may be a low voltage level, a low current level or a low logic level.

The first driving circuit 110 further informs the waveform of the test signals ST1 to the second driving circuit 120. Therefore, the second driving circuit 120 identifies the test signals ST1.

In the embodiment, the first driving circuit 110 sets a waveform of the test signal ST2 according to the first cycle number of a system clock CK and the second cycle number of a system clock CK. The waveform of the test signal ST2 is equal to the waveform of the test signal ST1. In some embodiments, the waveform of the test signal ST2 is not equal to the waveform of the test signal ST1. The first driving circuit 110 outputs the test signals ST1 and ST2 during different period.

Besides, the first driving circuit 110 sets a test cycle number of the test signal ST1 and a test cycle number of the test signal ST2. In the embodiment, the test cycle number of the test signal ST1 is equal to and the test cycle number of the test signal ST2. In some embodiments, the test cycle number of the test signal ST1 is not equal to and the test cycle number of the test signal ST2.

In the embodiment, the first driving circuit 110 sets a waveform of the complete signal SC according to a third cycle number of a system clock CK and a fourth cycle number of the system clock CK.

The first driving circuit 110 sets a time length of a high level of the complete signal SC according to a first cycle number of a system clock CK. For example, the first driving circuit 110 sets the first cycle number as "6", the disclosure is not limited thereto. Therefore, the time length of the high level of the complete signal SC is equal to 6 cycles of the system clock CK. The high level may be a high voltage level, a high current level or a high logic level.

The first driving circuit 110 sets a time length of a low level of the complete signal SC according to a second cycle number of a system clock CK. For example, the first driving circuit 110 sets the first cycle number as "3", the disclosure is not limited thereto. Therefore, the time length of the low level of the complete signal SC is equal to 3 cycles of the system clock CK. The low level may be a low voltage level, a low current level or a low logic level. The first driving circuit 110 further informs the waveform of the complete signal SC to the second driving circuit 120. Therefore, the second driving circuit 120 identifies the complete signal SC.

Figure 3:
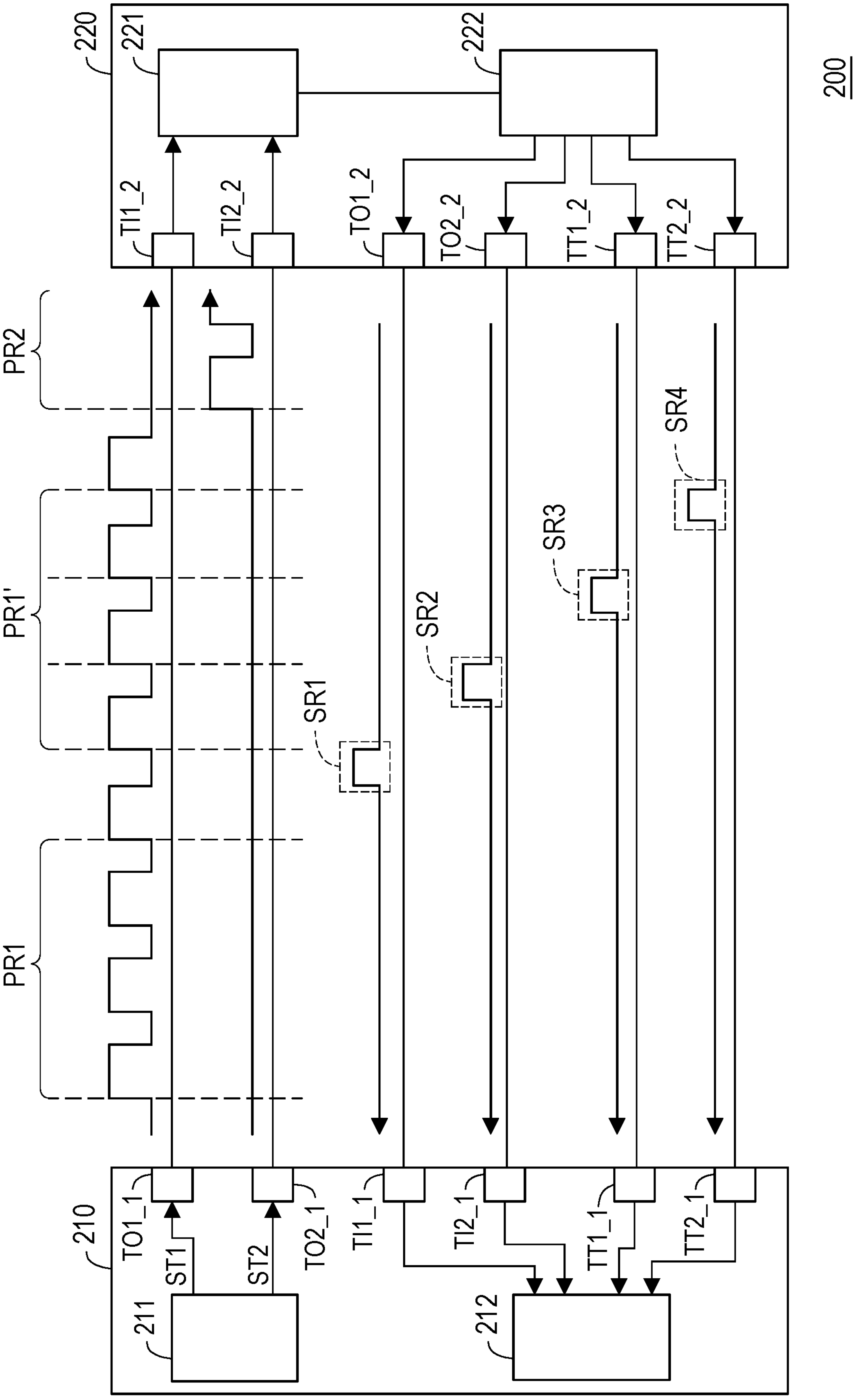
FIG. 3 illustrates an operating schematic diagram of a control circuit in a diagnosis stage according to an embodiment of the disclosure.

FIG. 3 illustrates an operating schematic diagram of a control circuit in a diagnosis stage according to an embodiment of the disclosure. Please refer to FIG. 3, in the embodiment, the control circuit 200 includes a first driving circuit 210 and a second driving circuit 220. The first driving circuit 210 includes the first output terminals TO1_1 and TO2_1, the first input terminals TI1_1 and TI2_1 and first transmission terminals TT1_1 and TT2_1. The second driving circuit 220 includes the second input terminals TI1_2 and TI2_2, the second output terminals TO1_2 and TO2_2 and second transmission terminals TT1_2 and TT2_2. The second input terminals TI1_2 and TI2_2 are connected to the first output terminals TO1_1 and TO2_1 in one-by-one manner. The second output terminals TO1_2 and TO2_2 are connected to the first input terminals TI1_1 and TI2_1 in one-by-one manner. The second transmission terminals TT1_2 and TT2_2 are connected to the first transmission terminals TT1_1 and TT2_1 in one-by-one manner. For example, the second transmission terminals TT1_2 is connected to the first output terminals TT1_1. The second transmission terminals TT2_2 is connected to the first transmission terminals TT2_1.

In the diagnosis stage, the first driving circuit 210 outputs the test signals ST1 and ST2 sequentially during different periods. The second driving circuit 220 receives the test signals ST1 and ST2. The second driving circuit 220 outputs the response signals SR1~SR4 to the second output terminals TO1_2 and TO2_2 and the second transmission terminal TT1_2 and TT2_2 sequentially during different periods in the diagnosis stage in response to the test signals ST1 and ST2. The first driving circuit 210 receives the response signals SR1~SR4 through the first input terminals TI1_1 and TI2_1 and the first transmission terminals TT1_1 and TT2_1. The first driving circuit 210 judges a connecting status of the first driving circuit 210 and the second driving circuit 220 according to the response signals SR1~SR4.

In the embodiment, when receiving the test signals ST1 and ST2 at different period, the second driving circuit 220 generates the response signals SR1~SR4 without the abnormal information. Therefore, when receiving the response signals SR1~SR4 without the abnormal information at different period, the first driving circuit 220 judges that the connecting status is normal.

For example, the test cycle number is set as "3", the disclosure is not limited thereto. Thus, the first driving circuit 210 outputs 3 test cycles of the test signal ST1 in a period PR1 and outputs 3 test cycles of the test signal ST2 in a period PR2. After receiving 3 test cycles of the test signal ST1 in the period PR1, the second driving circuit 220 starts outputting the response signals SR1~SR4 sequentially during different period. For example, the second driving circuit 220 outputs the response signals SR1 in the fourth test cycle of the test signal ST1, outputs the response signals SR2 in the fifth test cycle of the test signal ST1, and so on.

In the embodiment, the first driving circuit 210 outputs 3 test cycles of the test signal ST1 in the period PR1 and then outputs 3 test cycles of the test signal ST1 again in a period PR1'. In some embodiment, the period PR1' may be skipped.

In the embodiment, the first driving circuit 210 further includes a test signal generator 211 and a judge circuit 212. The test signal generator 211 is connected to the first output terminals TO1_1 and TO2_1. The test signal generator 211 generates the test signals ST1 and ST2, and outputs the test signals ST1 and ST2 sequentially during different period. The judge circuit 212 is connected to the first input terminals TI1_1 and TI2_1 and the first transmission terminals TT1_1 and TT2_1. The judge circuit 212 receives the response signals SR1~SR4 through the first input terminals TI1_1 and TI2_1 and the first transmission terminals TT1_1 and TT2_1. The judge circuit 212 judges the connecting status of the first driving circuit 210 and the second driving circuit 220 according to the response signals SR1~SR4.

The second driving circuit 220 further includes a determine circuit 221 and a response signal generator 222. The determine circuit 221 is connected to the second input terminals TI1_2 and TI2_2. The response signal generator 222 is connected to the second output terminals TO1_2 and TO2_2, second transmission terminals TT1_2 and TT2_2 and the determine circuit 221. The determine circuit 221 controls the response signal generator 222 to generate the response signals SR1~SR4 according to the test signals ST1 and ST2 received by the receiving circuit 221. When the waveforms and the timings of the test signals ST1 and ST2 are normal, determine circuit 221 controls the response signal generator 222 to generate the response signals SR1 and SR2 without the abnormal information. The response signal generator 222 outputs the response signals SR1~SR4 without the abnormal information sequentially during different period. The response signals SR1~SR4 without the abnormal information may be called pass signals.

When at least one of the test signals ST1 and ST2 is abnormal, the determine circuit 221 controls the response signal generator 222 to generate the response signals SR1~SR4 including the abnormal information. The response signal generator 222 outputs the response signals SR1~SR4 including the abnormal information sequentially during different period. The response signals SR1~SR4 including the abnormal information may be called failure signals.

In the disclosure, the first driving circuit 210 includes two or more first output terminals. The second driving circuit 220 includes two or more second output terminals. In the disclosure, a total number of the first input terminals and the first transmission terminals is higher than "1". A total number of the second input terminals and the second transmission terminals is higher than "1".

In the embodiment, at least one of the test signal generator 211 and the judge circuit 212 may be embedded in a first timing controller of the first driving circuit 210. In other words, the first timing controller may perform the at least one operation of the test signal generator 211 and the judge circuit 212.

In the embodiment, at least one of the determine circuit 221 and the response signal generator 222 may be embedded in a second timing controller of the first driving circuit 220. In other words, the second timing controller may perform the at least one operation of the determine circuit 221 and the response signal generator 222.

Figure 4:
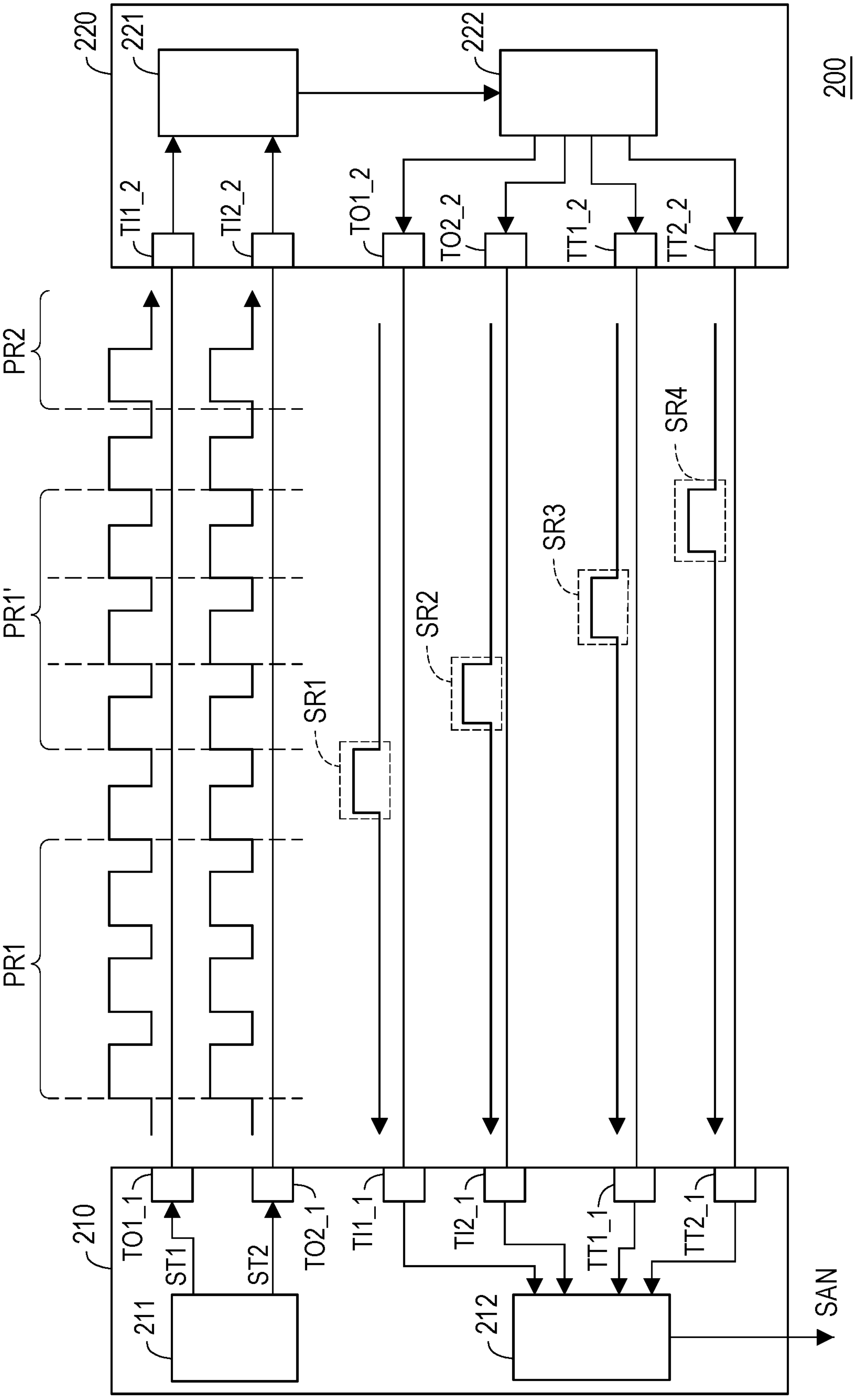
FIG. 4 illustrates an operating schematic diagram of a control circuit in a diagnosis stage according to an embodiment of the disclosure.

FIG. 4 illustrates an operating schematic diagram of a control circuit in a diagnosis stage according to an embodiment of the disclosure. Please refer to FIG. 4, in the embodiment, the test signal generator 211 outputs the test signals ST1 and ST2 sequentially during different period. However, the determine circuit 221 determines that the test signals ST1 and ST2 received by the second driving circuit have the same timing. This abnormal state indicates an abnormal short connection between the first output terminals TO1_1 and TO2_1.

Therefore, when at least two of the test signals ST1 and ST2 received by the second driving circuit 220 have the same timing, the second driving circuit 220 generates the response signals SR1~SR4 including the abnormal information during different periods in the diagnosis stage. In the embodiment, the judge circuit 212 judges that the connecting status is abnormal according to the response signals SR1~SR4 including the abnormal information. Thus, the judge circuit 212 outputs an abnormal notification signal SAN corresponding to this abnormal state.

Figure 5:
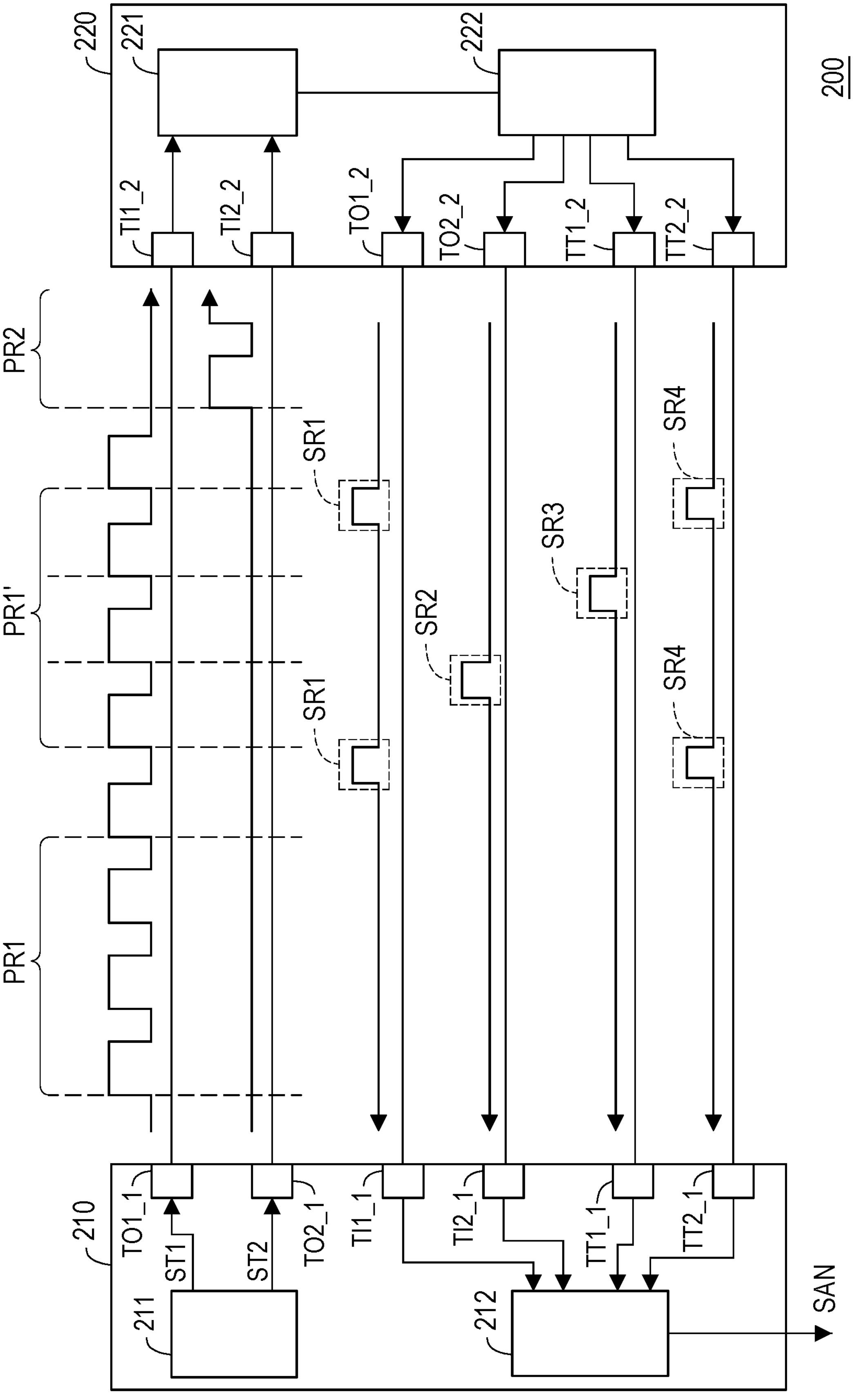
FIG. 5 illustrates an operating schematic diagram of a control circuit in a diagnosis stage according to an embodiment of the disclosure.

FIG. 5 illustrates an operating schematic diagram of a control circuit in a diagnosis stage according to an embodiment of the disclosure. Please refer to FIG. 5, in the embodiment, the response signal generator 222 outputs the response signals SR1~SR4 sequentially during different period. However, the response signals SR1 and SR4 received by the first driving circuit 210 have the same timing. This abnormal state indicates (1) an abnormal short connection between the first input terminal TI1_1 and the first transmission terminal TT2_1; and/or (2) an abnormal short connection between the second output terminal TO1_2 and the second transmission terminal TT2_2.

Therefore, when at least two of the plurality of response signals SR1~SR4 received by the judge circuit 212 of the first driving circuit 210 have the same timing, the judge circuit 212 judges that the connecting status of the first driving circuit 210 and the second driving circuit 220 is abnormal.

In the embodiment, the first driving circuit 210 judges that the connecting status is abnormal according to the response signals SR1~SR4. Thus, the judge circuit 212 outputs an abnormal notification signal SAN corresponding to this abnormal state.

Figure 6:
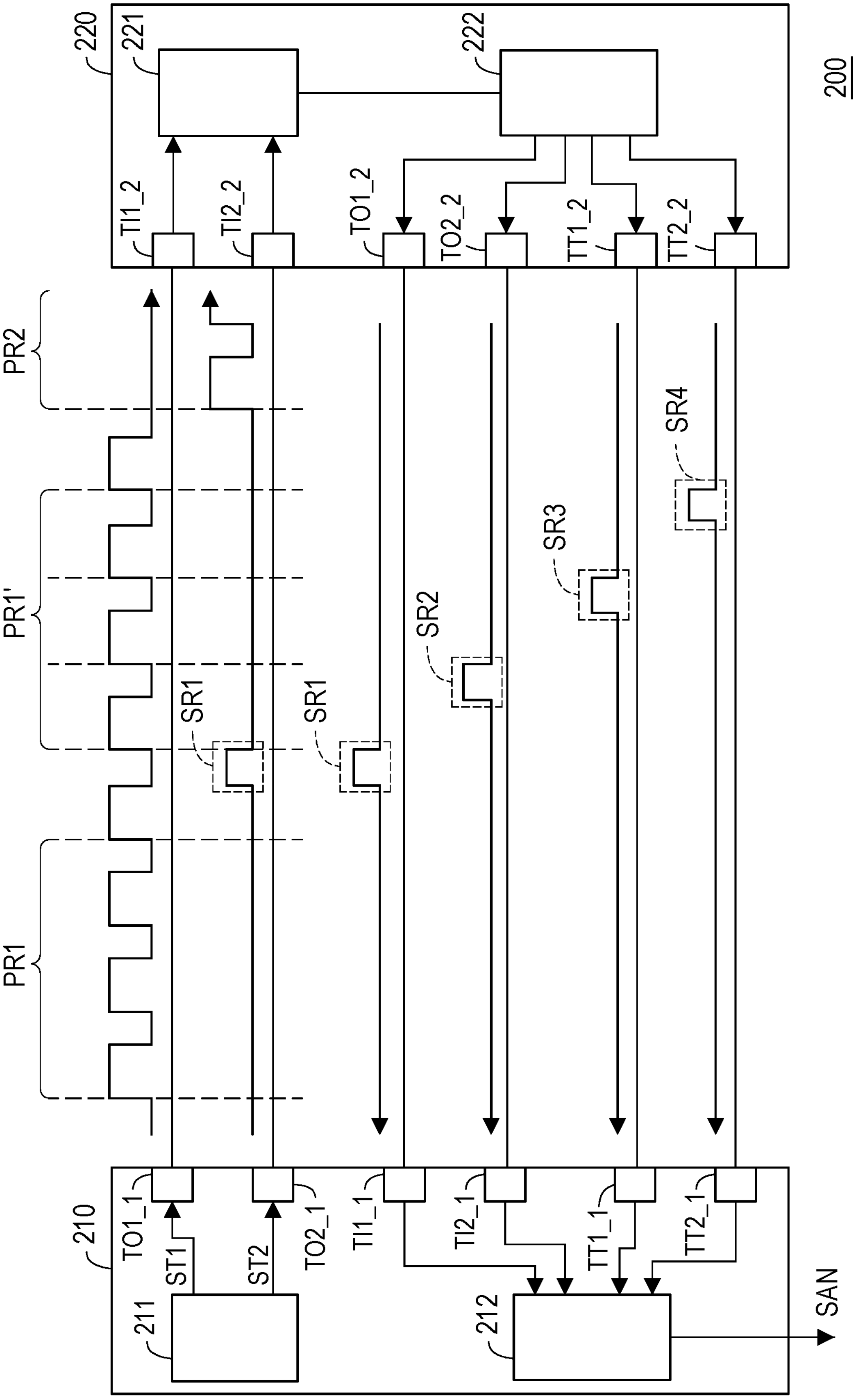
FIG. 6 illustrates an operating schematic diagram of a control circuit in a diagnosis stage according to an embodiment of the disclosure.

FIG. 6 illustrates an operating schematic diagram of a control circuit in a diagnosis stage according to an embodiment of the disclosure. Please refer to FIG. 6, in the embodiment, the first driving circuit 210 detects signals on the first output terminals TO1_1 and TO2_1. When at least one of the response signals SR1~SR4 is detected on at least one of the first output terminals TO1_1 and TO2_1, the first driving circuit 210 judges that (1) the at least one of the first output terminals TO1_1 and TO2_1 and at least one of the first input terminals TI1_1 and TI2_1 are shorted from each other; and/or (2) the at least one of the first output terminals TO1_1 and TO2_1 and at least one of the first transmission terminals TT1_1 and TT2_1 are shorted from each other.

For example, the judge circuit 212 detects signals on the first output terminals TO1_1 and TO2_1. When the response signals SR1 is detected on the first output terminal TO2_1, the judge circuit 212 judges that the first output terminal TO2_1 and the first input terminal TI1_1 are shorted from each other. Thus, the judge circuit 212 outputs an abnormal notification signal SAN corresponding to this abnormal state.

Figure 7:
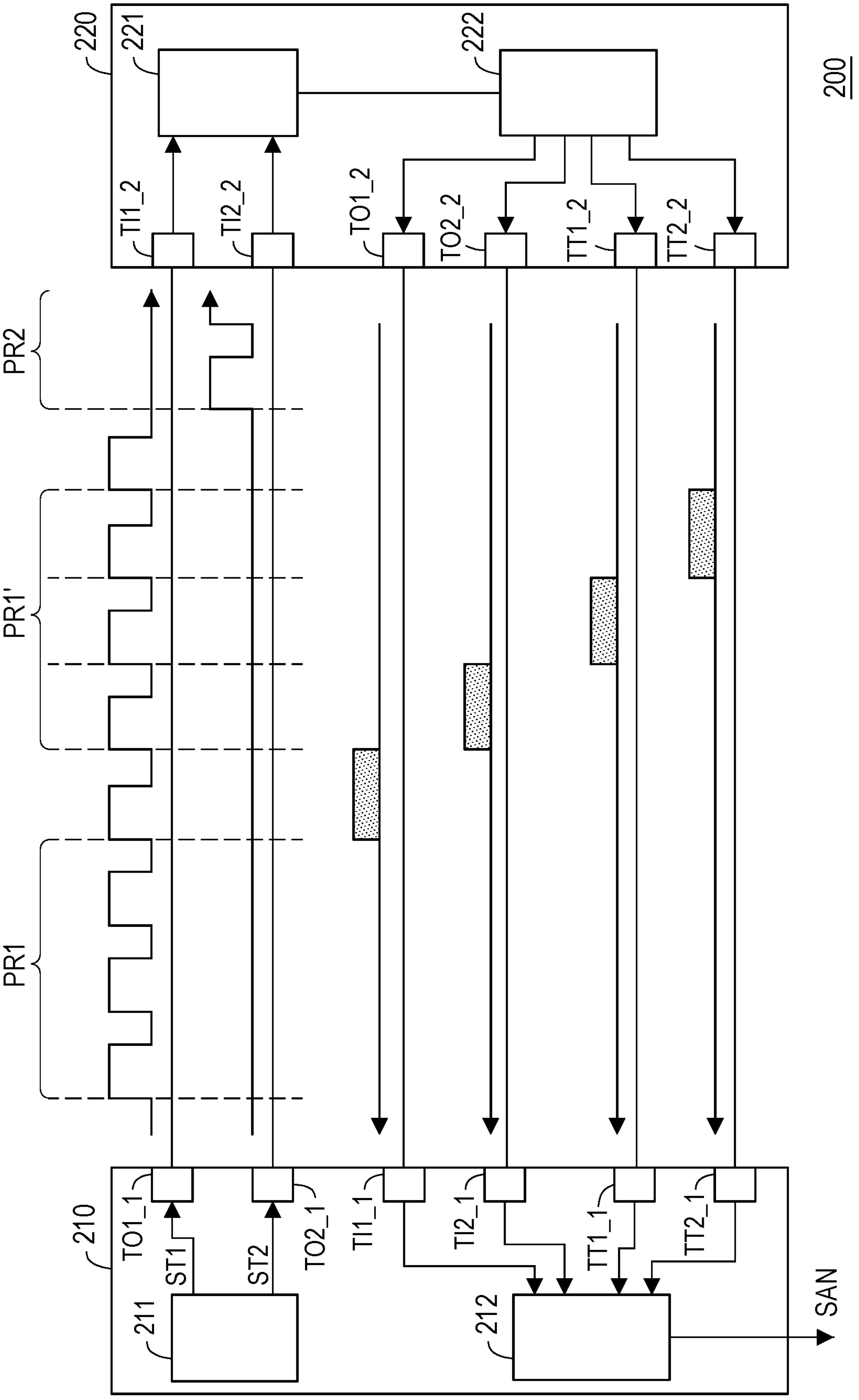
FIG. 7 illustrates an operating schematic diagram of a control circuit in a diagnosis stage according to an embodiment of the disclosure.

FIG. 7 illustrates an operating schematic diagram of a control circuit in a diagnosis stage according to an embodiment of the disclosure. Please refer to FIG. 7, in the embodiment, after outputting 3 test cycles of the test signal ST1 by the first driving circuit 210, the first driving circuit 210 cannot identify the response signals SR1~SR4. The first driving circuit 210 judges that the connecting status is abnormal. For example, the test cycle number is set as "3", the disclosure is not limited thereto.

For example, the test cycle number is set as "3", the disclosure is not limited thereto. After outputting 3 test cycles of the test signal ST1 by the test signal generator 211, the judge circuit 212 cannot identify all of the response signals SR1~SR4. Signals received by the judge circuit 212 may be noise signals. This abnormal state indicates (1) an abnormal disconnection between the first output terminals TO1_1 and the test signal generator 211; (2) an abnormal disconnection between the first output terminals TO1_1 and the second input terminals TI1_2; (3) an abnormal disconnection between the second input terminals TI1_2 and the determine circuit 221 and/or (4) that the second driving circuit 220 is failure. Thus, the judge circuit 212 outputs an abnormal notification signal SAN corresponding to this abnormal state.

Figure 8:
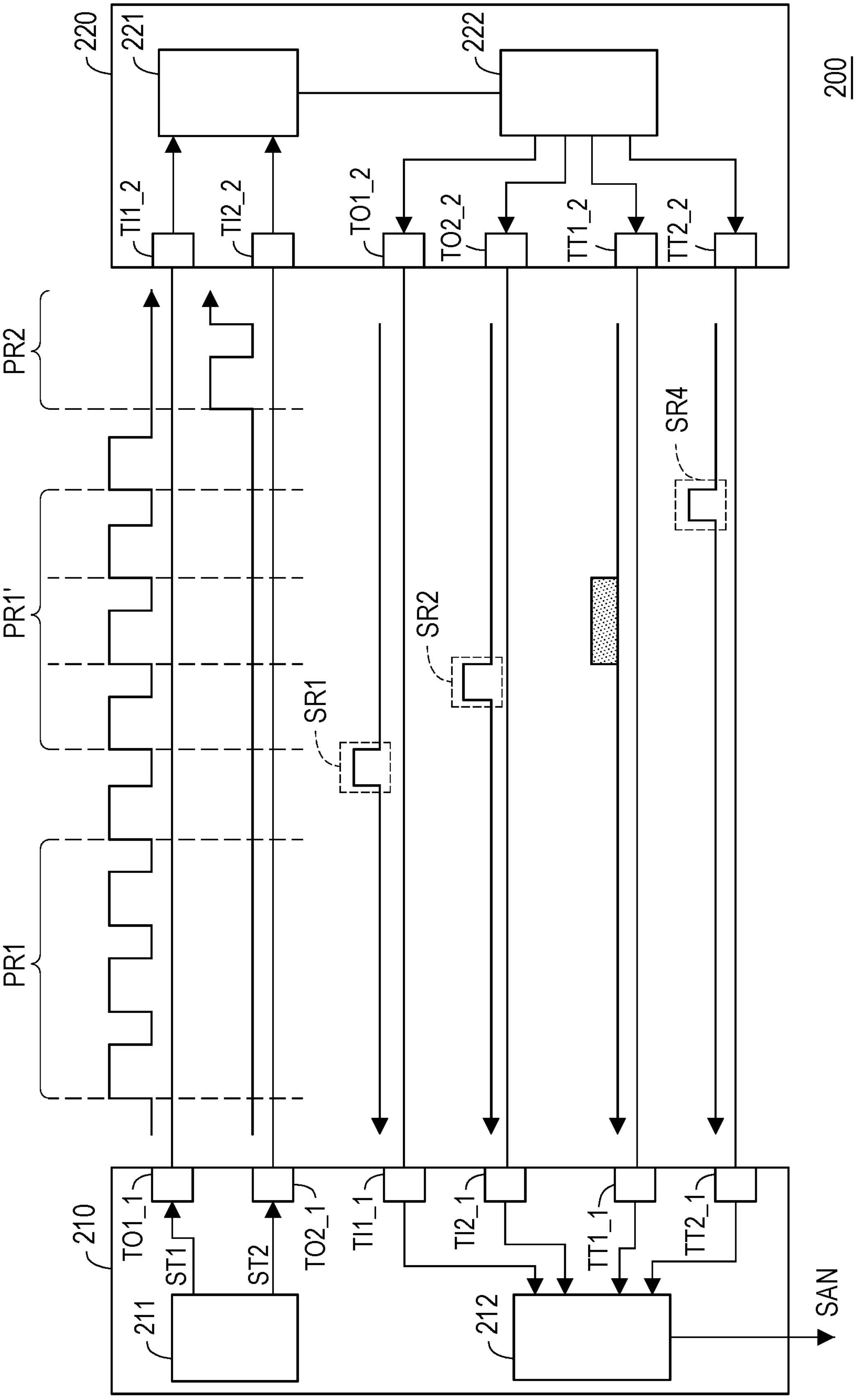
FIG. 8 illustrates an operating schematic diagram of a control circuit in a diagnosis stage according to an embodiment of the disclosure.

FIG. 8 illustrates an operating schematic diagram of a control circuit in a diagnosis stage according to an embodiment of the disclosure. Please refer to FIG. 8, in the embodiment, for example, the test cycle number is set as "3", the disclosure is not limited thereto. After outputting 3 test cycles of the test signal ST1 by the test signal generator 211, the judge circuit 212 cannot identify the response signals SR3. Signals received by the judge circuit 212 through the first transmission terminals TT1_1 may be a noise signal.

This abnormal state indicates (1) an abnormal disconnection between the first transmission terminals TT1_1 and the judge circuit 212; (2) an abnormal disconnection between the first transmission terminal TT1_1 and the first transmission terminal TT1_2; and/or (3) an abnormal disconnection between the first transmission terminals TT1_2 and the response signal generator 222. Thus, the judge circuit 212 outputs an abnormal notification signal SAN corresponding to this abnormal state.

Based on the embodiments of FIG. 7 and FIG. 8, when at least one of the response signals SR11~SR4 cannot be identified by the first driving circuit 210, the first driving circuit 210 judges that the connecting status is abnormal.

Figure 9:
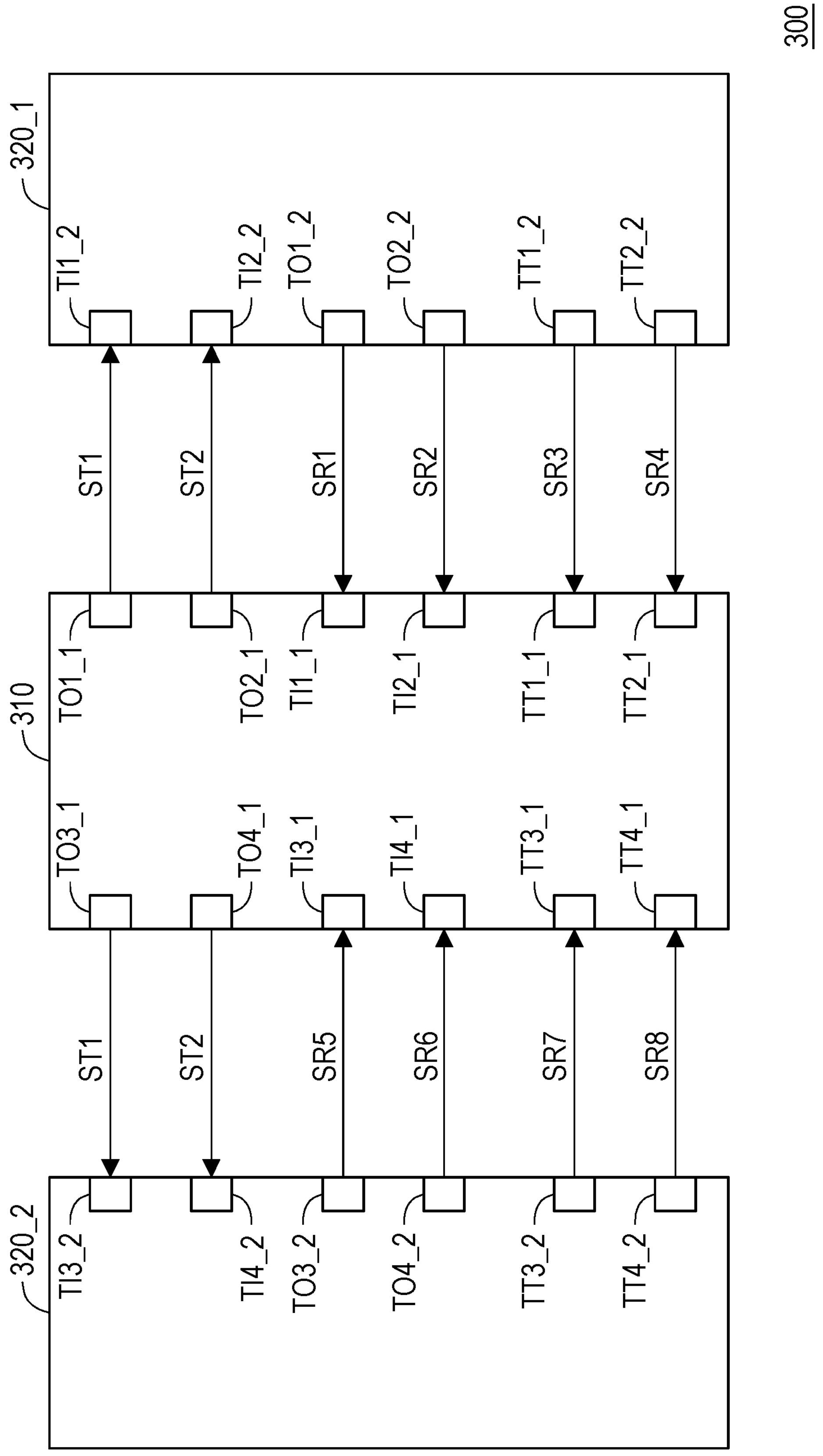
FIG. 9 illustrates a schematic diagram of a control circuit according to an embodiment of the disclosure.

FIG. 9 illustrates a schematic diagram of a control circuit according to a third embodiment of the disclosure. In the embodiment, the control circuit 300 includes a first driving circuit 310 and second driving circuits 320_1 and 320_2. In the operating stage, the first driving circuit 310 drives a first part of a display panel (for example, the part P1 of the display panel PL in FIG. 1). The driving circuit 320_1 drives a second part of the display panel (for example, the part P2 of the display panel PL in FIG. 1). The driving circuit 320_2 drives a third part of the display panel.

The first driving circuit 310 includes the first output terminals TO1_1~TO4_1, the first input terminals TI1_1~TI4_1 and first transmission terminals TT1_1~TT4_1. The second driving circuit 320_1 includes the second input terminals TI1_2 and TI2_2, the second output terminals TO1_2 and TO2_2 and second transmission terminals TT1_2 and TT2_2. The second input terminals TI1_2 and TI2_2 are connected to the first output terminals TO1_1 and TO2_1 in one-by-one manner. The second output terminals TO1_2 and TO2_2 are connected to the first input terminals TI1_1 and TI2_1 in one-by-one manner. The second transmission terminals TT1_2 and TT2_2 are connected to the first transmission terminals TT1_1 and TT2_1 in one-by-one manner. A connecting between the first driving circuit 310 and the second driving circuits 320_1 is taught by the embodiments of FIG. 3.

The second driving circuit 320_2 includes the second input terminals TI3_2 and TI4_2, the second output terminals TO3_2 and TO4_2 and second transmission terminals TT3_2 and TT4_2. The second input terminals TI3_2 and TI4_2 are connected to the first output terminals TO3_1 and TO4_1 in one-by-one manner. The second output terminals TO3_2 and TO4_2 are connected to the first input terminals TI3_1 and TI4_1 in one-by-one manner. The second transmission terminals TT3_2 and TT4_2 are connected to the first transmission terminals TT3_1 and TT4_1 in one-by-one manner. A connecting between the first driving circuit 310 and the second driving circuits 320_2 is similar to the connecting between the first driving circuit 310 and the second driving circuits 320_1. For example, the second input terminals TI3_2 is connected to the first output terminals TO3_1. The second input terminals TI4_2 is connected to the first output terminals TO4_1. The second output terminals TO3_2 is connected to the first input terminals TI3_1. The second output terminals TO4_2 is connected to the first input terminals TI4_1. The second transmission terminals TT3_2 is connected to the first output terminals TT3_1. The second transmission terminals TT4_2 is connected to the first output terminals TT4_1.

Figure 10:
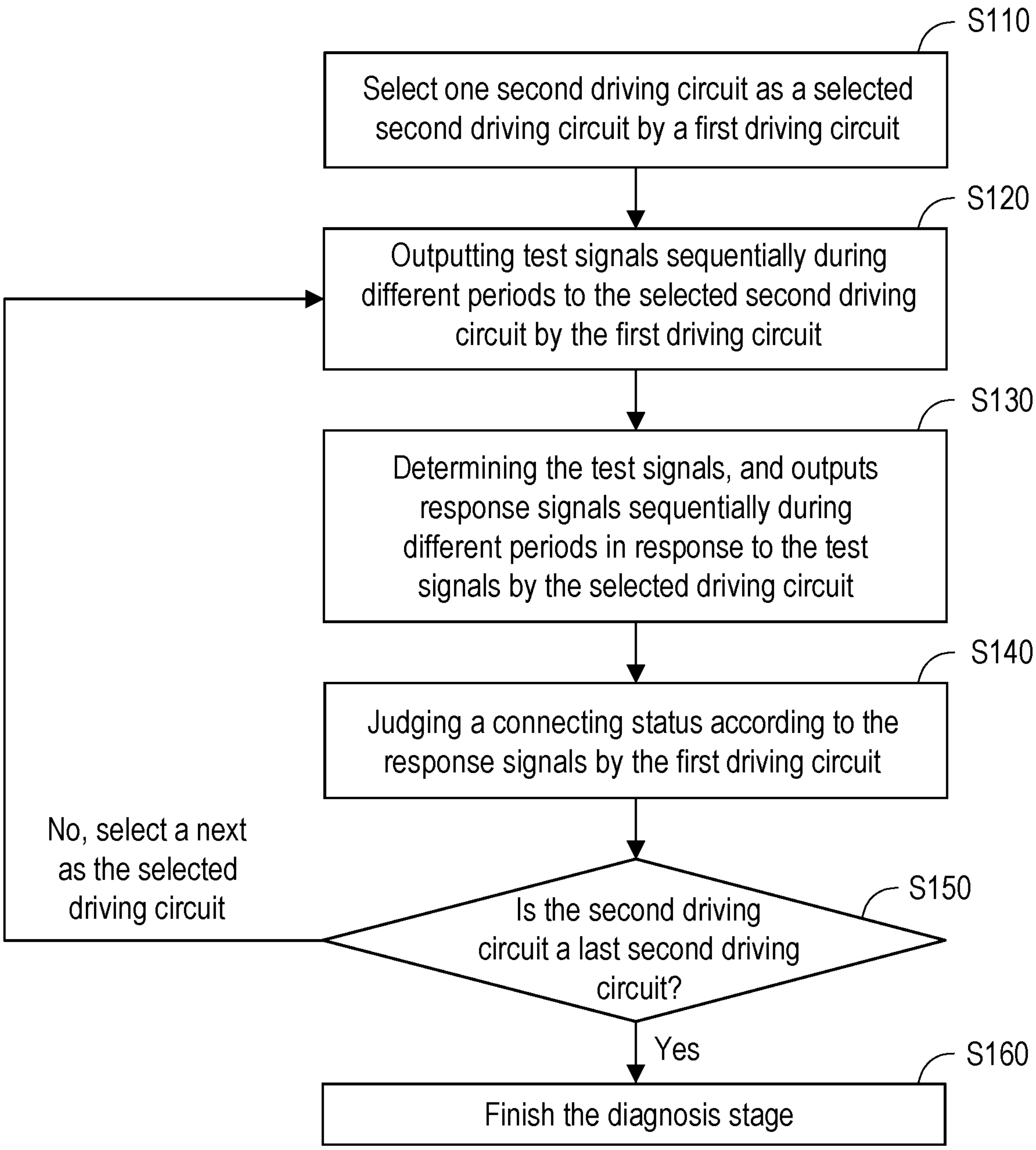
FIG. 10 illustrates an operating flow chart of a control circuit in a diagnosis stage according to an embodiment of the disclosure.

FIG. 10 illustrates an operating flow chart of a control circuit in a diagnosis stage according to an embodiment of the disclosure. Please refer to FIG. 9 and FIG. 10, in a step S110, the first driving circuit 310 selects one second driving circuit among of the second driving circuits 320_1 and 320_2 as a selected second driving circuit. In a step S120, the first driving circuit 310 outputs the test signals ST1 and ST2 sequentially during different periods to the selected second driving circuit.

For example, the first driving circuit 310 selects the second driving circuit 320_1 as the selected second driving circuit in the step S110, and outputs the test signals ST1 and ST2 to the first output terminals TO1_1 and TO2_1 in the step S120.

In a step S130, the second driving circuit 320_1 receives the test signals ST1 and ST2 through the second input terminals TI1_2 and TI2_2. The second driving circuit 320_1 determines the test signals ST1 and ST2, and outputs response signals SR1~SR4 sequentially during different periods in response to the test signals ST1 and ST2.

For example, a number of the second input terminals is "Y". A number of second transmission terminals for outputting signals is "Z". A transmission cycle of each of the response signals SR1—SR4 is "Q" cycle of the system clock. Thus, the second driving circuit 320_1 spends "Q(Y+Z)" cycles to output all of the response signals SR1~SR4 in a step S130.

Detailly, the second driving circuit 320_1 may check transmitting directions of the second transmission terminals TT1_2 and TT2_2. If the transmitting directions of the second transmission terminals TT1_2 and TT2_2 are used to output signals, the second driving circuit 320_1 outputs the response signals SR1~SR4 through the second output terminals TO1_2 and TO2_2 and the second transmission terminals TT1_2 and TT2_2 sequentially during different periods in response to the test signals ST1 and ST2. If the second transmission terminals TT1_2 and TT2_2 are used to input signals, the second driving circuit 320_1 outputs the response signals SR1 and SR2 through the second output terminals TO1_2 and TO2_2 sequentially during different periods in response to the test signals ST1 and ST2.

For example, if both of the test signals ST1 and ST2 are normal, the second driving circuit 320_1 outputs the response signals SR1~SR4 without the abnormal information (that is, the pass signals). On the other hand, if at least one of the test signals ST1 and ST2 is abnormal, the second driving circuit 320_1 outputs the response signals SR1~SR4 including the abnormal information (that is, the failure signals).

In some embodiments, the second driving circuit 320_1 may be paused outputting the response signals SR1~SR4. Then the second driving circuit 320_1 enters a wait state. In the wait state, the second driving circuit 320_1 counts a maintenance time length of the waiting state. If the maintenance time length reaches a default time length. The second driving circuit 320_1 may leave the diagnosis stage.

In a step S140, the first driving circuit 310 judges the connecting status of the first driving circuit 310 and the second driving circuit 320_1 according to the response signals SR1—SR4. A detail operation of the step S140 can be taught by the embodiments of FIG. 3 to FIG. 8. Thus, the detail operation is not repeated again hereof.

For example, the number of the second input terminals is "Y". The number of second transmission terminals for outputting signals is "Z". the transmission cycle of each of the response signals SR1—SR4 is "Q" cycle of the system clock. Thus, the first driving circuit 310 spends at least "Q(Y+Z+1)" cycles to judge the connecting status of the first driving circuit 310 and the second driving circuit 320_1.

In a step S150, the first driving circuit 310 determines that the second driving circuit 320_1 is a last second driving circuit or not. When the second driving circuit 320_1 is not the last second driving circuit, the first driving circuit 310 selects next second driving circuit as the last second driving circuit, and return to the step S120.

For example, when the second driving circuit 320_1 is not the last second driving circuit, the first driving circuit 310 selects the second driving circuit 320_2 as the last second driving circuit. Therefore, the first driving circuit 310 outputs the test signals ST1 and ST2 to the first output terminals TO3_1 and TO4_1 in the step S120.

In the step S130, the second driving circuit 320_2 receives the test signals ST1 and ST2 through the second input terminals TI3_2 and TI4_2. The second driving circuit 320_2 determines the test signals ST1 and ST2, and generates the response signals SR5—SR8 in response to the test signals ST1 and ST2. The second driving circuit 320_2 outputs the response signals SR1—SR4 through the second output terminals TO3_2 and TO4_2 and the second transmission terminals TT3_2 and TT4_2 sequentially during different periods.

In the step S140, the first driving circuit 310 judges the connecting status of the first driving circuit 310 and the second driving circuit 320_2 according to the response signals SR5~SR8.

In the step S150, the first driving circuit 310 determines that the second driving circuit 320_2 is the last second driving circuit or not. When the second driving circuit 320_2 is the last second driving circuit, the first driving circuit 310 finishes the diagnosis stage in a step S160. Thus, the control circuit 300 leaves the diagnosis stage.

In some embodiments, the control circuit 300 includes one second driving circuit. Therefore, the steps S110, S150 and S160 could be skipped.

Figure 11:
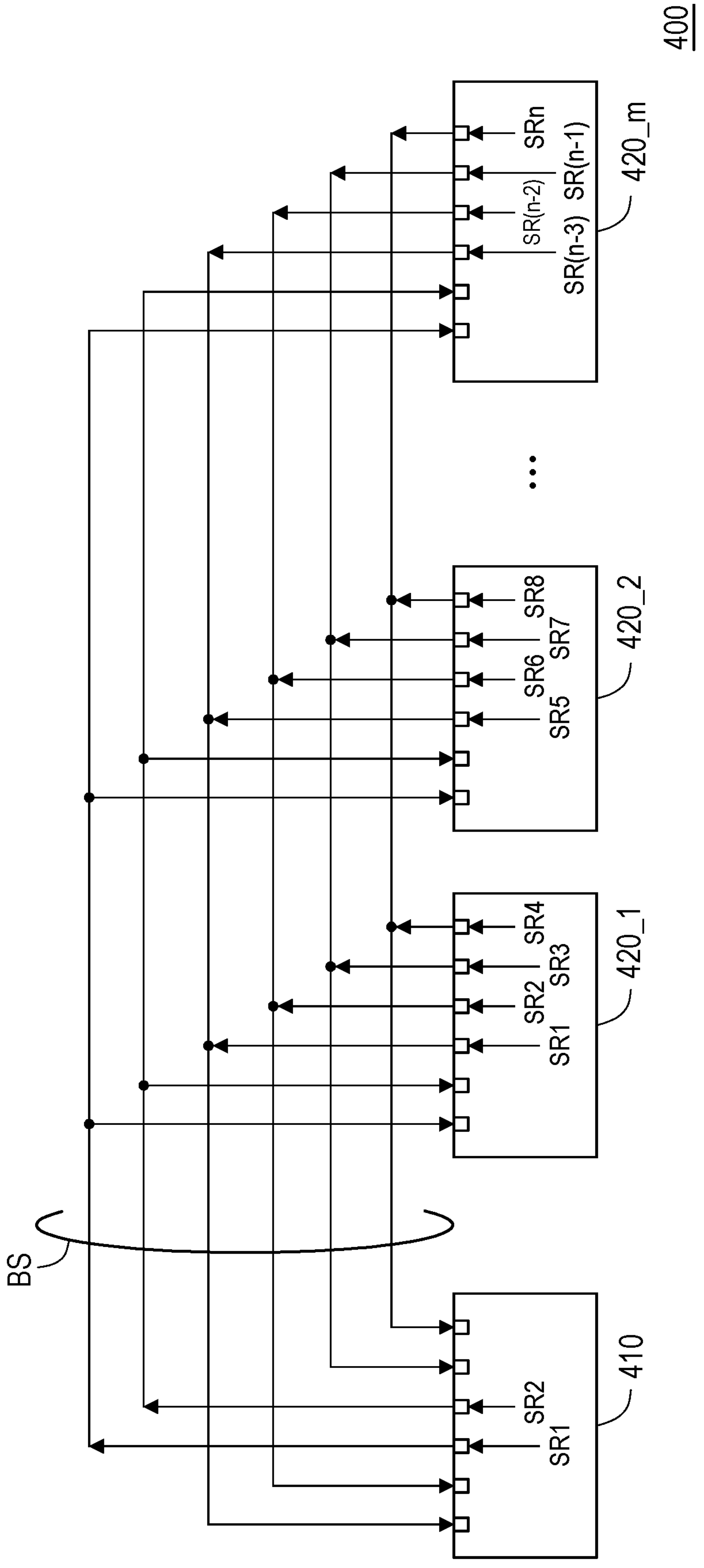
FIG. 11 illustrates a schematic diagram of a control circuit according to an embodiment of the disclosure.

FIG. 11 illustrates a schematic diagram of a control circuit according to an embodiment of the disclosure. Please refer to FIG. 10 and FIG. 11, in the embodiment, the control circuit 400 includes a first driving circuit 410 and second driving circuits 420_1~420_*m*. In the operating stage, each of the first driving circuit 410 and the second driving circuits 420_1~420_*m* drives corresponding part of display panel PL.

Similar to the first driving circuit 310 and the second driving circuits 320_1 of FIG. 3, the first driving circuit 410 includes the first output terminals, the first input terminals and the first transmission terminals (not shown in FIG. 11). Each of the second driving circuits 420_1~420_*m* includes the second output terminals, the second input terminals and the second transmission terminals (not shown in FIG. 11).

The second output terminals of the second driving circuits 420_1~420_*m* are connected to the first input terminals through a connecting bus BS. The second input terminals of the second driving circuits 420_1~420_*m* are connected to the first output terminals through the connecting bus BS. The second transmission terminals of the second driving circuits 420_1~420_*m* are connected to the first transmission terminals through the connecting bus BS.

The first driving circuit 410 judges a connecting status of the first driving circuit 410 and the second driving circuits 420_1~420_*m* in different time period.

The first driving circuit 410 selects the second driving circuit 420_1 as the selected second driving circuit in the step S110 in a first time period, the first driving circuit 410 outputs the test signals ST1 and ST2 to the different first output terminals sequentially during different periods in the step S120. The second driving circuits 420_1 receives the test signals ST1 and ST2 through the second input terminals. The second driving circuit 420_1 determines the test signals ST1 and ST2 and outputs response signals SR1—SR4 sequentially during different periods in response to the test signals ST1 and ST2 in the step S130. In the first time period, the first driving circuit 410 judges the connecting status of the first driving circuit 410 and the second driving circuit 420_1 according to the response signals SR1—SR4 in the step S140. A detail operation of the step S140 can be taught by the embodiments of FIG. 3 to FIG. 9. Thus, the detail operation is not repeated again hereof.

The first driving circuit 410 selects the second driving circuit 420_2 as the selected second driving circuit in the step S110 in a second time period, the first driving circuit 410 outputs the test signals ST1 and ST2 to the different first output terminals sequentially during different periods in the step S120. The second driving circuits 420_2 receives the test signals ST1 and ST2 through the second input terminals. The second driving circuit 420_2 determines the test signals ST1 and ST2 and outputs response signals SR5~SR8 sequentially during different periods in response to the test signals ST1 and ST2 in the step S130. In the second time period, the first driving circuit 410 judges the connecting status of the first driving circuit 410 and the second driving circuit 420_2 according to the response signals SR5~SR8 in the step S140.

The first driving circuit 410 selects the second driving circuit 420_*m* as the selected second driving circuit in the step S110 in a (m)th time period, the first driving circuit 410 outputs the test signals ST1 and ST2 to the different first output terminals sequentially during different periods in the step S120. The second driving circuits 420_*m* receives the test signals ST1 and ST2 through the second input terminals. The second driving circuit 420_*m* determines the test signals ST1 and ST2 and outputs response signals SR(n−3)~SRn sequentially during different periods in response to the test signals ST1 and ST2 in the step S130. In the (m)th time period, the first driving circuit 410 judges the connecting status of the first driving circuit 410 and the second driving circuit 420_*m* according to the response signals SR5~SR8 in the step S140.

In view of the foregoing, the first driving circuit outputs the test signals to the first output terminals sequentially during different periods in a diagnosis stage. The second driving circuit outputs the response signals to the second output terminals sequentially during different periods in response to the test signals in the diagnosis stage. The first driving circuit judges the connecting status of the first driving circuit and the second driving circuit. Therefore, in the diagnosis stage, the control circuit provides the automatic diagnosis mechanism for checking a circuit connection of the first driving circuit and the second driving circuit. The control circuit 100 further increases a speed for checking a circuit connection of the first driving circuit and the second driving circuit. Besides, the automatic diagnosis mechanism is further used to the control circuit including the first driving circuit and at least two second driving circuits.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control circuit for controlling a display panel, comprising:

a first driving circuit, connected to a first part of the display panel, configured to drive the first part in an operating stage, wherein the first driving circuit comprises:

a plurality of first output terminals, wherein the first driving circuit outputs a plurality of test signals to the plurality of first output terminals sequentially during different periods in a diagnosis stage; and a plurality of first input terminals; and a second driving circuit, connected to a second part of the display panel, configured to drive the second part in the operating stage, wherein the second driving circuit comprises:

a plurality of second input terminals, connected to the plurality of first output terminals in one-by-one manner; and a plurality of second output terminals, connected to the plurality of first input terminals in one-by-one manner, wherein the second driving circuit receives the plurality of test signals through the plurality of second input terminals in the diagnosis stage, and outputs a plurality of response signals to the plurality of second output terminals sequentially during the different periods in the diagnosis stage in response to the plurality of test signals, and wherein the first driving circuit receives the plurality of response signals through the plurality of first input terminals in the diagnosis stage, and judges a connecting status of the first driving circuit and the second driving circuit according to the plurality of response signals.

2. The control circuit of claim 1, wherein the first driving circuit sets a waveform of the plurality of test signals according to a first cycle number of a system clock and a second cycle number of a system clock.

3. The control circuit of claim 1, wherein:

the first driving circuit provides a complete signal to the second driving circuit through at least one of the plurality of first output terminals when finishing judging the connecting status and the second driving circuit finishes the diagnosis stage in response to the complete signal.

4. The control circuit of claim 1, wherein when at least two of the plurality of test signals received by the second driving circuit have a same timing, the second driving circuit generates the plurality of response signals comprising an abnormal information during the different periods in the diagnosis stage.

5. The control circuit of claim 4, wherein the first driving circuit judges that the connecting status is abnormal according to the plurality of response signals comprising the abnormal information.

6. The control circuit of claim 1, wherein when at least two of the plurality of response signals received by the first driving circuit have a same timing, the first driving circuit judges that the connecting status is abnormal.

7. The control circuit of claim 1, wherein:

the first driving circuit detects a plurality of signals on the plurality of first output terminals, when at least one of the plurality of response signals is on at least one of the plurality of first output terminals, the first driving circuit judges that the at least one of the plurality of first output terminals and at least one of the plurality of first input terminals are shorted from each other.

8. The control circuit of claim 1, wherein when at least one of the plurality of response signals cannot be identified by the first driving circuit, the first driving circuit judges that the connecting status is abnormal.

9. The control circuit of claim 1, wherein:

the first driving circuit further comprises at least one first transmission terminal, the second driving circuit further comprises at least one second transmission terminal, and the at least one second transmission terminal is connected to the at least one first transmission terminal in one-by-one manner.

10. The control circuit of claim 9, wherein:

the second driving circuit outputs the plurality of response signals to the plurality of second output terminals and the at least one second transmission terminal sequentially during the different periods in the diagnosis stage in response to the plurality of test signals, and the first driving circuit receives the plurality of response signals through the plurality of first input terminals and the at least one first transmission terminal in the diagnosis stage, and judges the connecting status of the first driving circuit and the second driving circuit.

* * * * *